United States Patent
Chen et al.

(10) Patent No.: US 10,185,144 B2
(45) Date of Patent: Jan. 22, 2019

(54) OPTICAL ASSEMBLY AND OPTICAL MODULE

(71) Applicant: InnoLight Technology (Suzhou) LTD., Suzhou, Jiangsu (CN)

(72) Inventors: Long Chen, Jiangsu (CN); Yuzhou Sun, Jiangsu (CN); Donghan Wang, Jiangsu (CN); Weilong Li, Jiangsu (CN); Dengqun Yu, Jiangsu (CN)

(73) Assignee: InnoLight Technology (Suzhou) Ltd., Suzhou (CN)

( * ) Notice: Subject to any disclaimer, the term of this patent is extended or adjusted under 35 U.S.C. 154(b) by 193 days.

(21) Appl. No.: 15/414,884

(22) Filed: Jan. 25, 2017

(65) Prior Publication Data

US 2017/0227762 A1 Aug. 10, 2017

(30) Foreign Application Priority Data

Feb. 5, 2016 (CN) .......................... 2016 1 0082267

(51) Int. Cl.
| | | |
|---|---|---|
| *G02B 7/04* | (2006.01) | |
| *G02B 27/00* | (2006.01) | |
| *G02B 6/42* | (2006.01) | |
| *H04B 10/40* | (2013.01) | |
| *G02B 27/30* | (2006.01) | |
| *H04B 10/25* | (2013.01) | |
| *H04J 14/02* | (2006.01) | |

(52) U.S. Cl.
CPC ....... *G02B 27/0025* (2013.01); *G02B 6/4206* (2013.01); *G02B 6/4212* (2013.01); *G02B 27/30* (2013.01); *H04B 10/2504* (2013.01); *H04B 10/40* (2013.01); *H04J 14/02* (2013.01)

(58) Field of Classification Search
CPC .... G02B 27/0025; G02B 7/04; G02B 6/4206; G02B 27/30; G02B 6/4212; H04B 10/2504; H04B 10/40; H04J 14/02
USPC ........................................ 250/201.2
See application file for complete search history.

(56) References Cited

U.S. PATENT DOCUMENTS 4,530,080 A * 7/1985 Aoi ...................... G11B 7/0045
250/201.5
6,496,468 B2 * 12/2002 Hajjar .................... B82Y 10/00
369/13.33

* cited by examiner

*Primary Examiner* — Seung C Sohn
(74) *Attorney, Agent, or Firm* — Finnegan, Henderson, Farabow, Garrett & Dunner, LLP

(57) ABSTRACT

An optical assembly is provided. The optical assembly includes a light transmitting terminal, a light receiving terminal, an optical component located between the light transmitting terminal and the light receiving terminal, a collimating unit located between the optical component and the light transmitting terminal, and a focusing unit located between the optical component and the light receiving terminal. The collimating unit includes a first lens located between the optical component and the light transmitting terminal, and a field lens located between the first lens and the optical component and configured to absorb an alignment error between the light transmitting terminal and the first lens. The focusing unit includes a second lens located between the optical component and the light receiving terminal.

18 Claims, 4 Drawing Sheets

OPTICAL ASSEMBLY AND OPTICAL MODULE

CROSS-REFERENCE TO RELATED APPLICATION

This application is based upon and claims priority to Chinese Patent Application No. 201610082267.9, filed Feb. 5, 2016, the entire content of which is incorporated herein by reference.

TECHNICAL FIELD

The present disclosure generally relates to the technical field of optical communication and, more particularly, to an optical assembly and optical module.

BACKGROUND

An optical module comprises a photoelectric device, a functional circuit, and an optical interface terminal, etc. The photoelectric device comprises a transmitting part and a receiving part. Simply speaking, the primary function of an optical module is to carry out photoelectric conversion. Electrical signals are converted into optical signals at a sending terminal. The optical signals are transmitted through optical fibers and then converted into electrical signals at a receiving terminal, thereby enabling the transmission of information.

When the optical path of an optical module is designed in free space, it is generally necessary to incorporate optical components such as an optical circulator, a wavelength division multiplexing (WDM) device, and a demultiplexer, etc. As a result, a relatively long optical path is often required to satisfy the design requirements for the optical module.

SUMMARY

In one aspect, the present disclosure provides an optical assembly. The optical assembly includes a light transmitting terminal, a light receiving terminal, an optical component located between the light transmitting terminal and the light receiving terminal, a collimating unit located between the optical component and the light transmitting terminal, and a focusing unit located between the optical component and the light receiving terminal. The collimating unit includes a first lens located between the optical component and the light transmitting terminal, and a field lens located between the first lens and the optical component and configured to absorb an alignment error between the light transmitting terminal and the first lens. The focusing unit includes a second lens located between the optical component and the light receiving terminal.

In another aspect, the present disclosure provides an optical module having an optical assembly. The optical assembly includes a light transmitting terminal, a light receiving terminal, an optical component located between the light transmitting terminal and the light receiving terminal, a collimating unit located between the optical component and the light transmitting terminal, and a focusing unit located between the optical component and the light receiving terminal. The collimating unit includes a first lens located between the optical component and the light transmitting terminal, and a field lens located between the first lens and the optical component and configured to absorb an alignment error between the light transmitting terminal and the first lens. The focusing unit includes a second lens located between the optical component and the light receiving terminal.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

Figure 1:
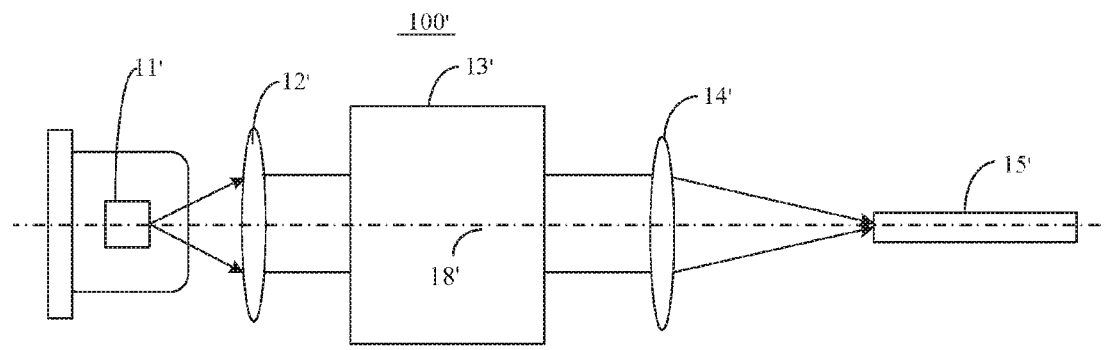
FIG. 1 is a schematic diagram showing an optical path of transmission in an optical assembly in a conventional technology.

Specific embodiments in this disclosure have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

An optical assembly is provided in the present disclosure. The optical assembly comprises a light transmitting terminal, a light receiving terminal, and an optical component located between the light transmitting terminal and the light receiving terminal. The optical assembly further comprises a collimating unit located between the optical component and the light transmitting terminal, and a focusing unit located between the optical component and the light receiving terminal. The collimating unit comprises a first lens located between the optical component and the light transmitting terminal, and a field lens located between the first lens and the optical component. The focusing unit comprises a second lens located between the optical component and the light receiving terminal. The field lens is configured to absorb an alignment error between the light transmitting terminal and the first lens.

In some embodiments, the first lens and second lens are convex or plano-convex lenses, and the field lens is a convex, plano-convex, concave, or plano-concave lens.

In some embodiments, the field lens is a convex or plano-convex lens, and the image point associated with the first lens is a real image point located between the first lens and the field lens.

In some embodiments, a distance between the light transmitting terminal and the first lens is greater than the focal length of the first lens. Optical signals sent from the light transmitting terminal pass sequentially through the first lens, the field lens, the optical component, and the second lens, and finally focus at the light receiving terminal.

In some embodiments, the field lens is a convex or plano-convex lens, and the image point associated with the first lens is a virtual image point located on the same side as the light transmitting terminal relative to the first lens.

In some embodiments, a distance between the light transmitting terminal and the first lens is less than the focal length of the first lens. Optical signals sent from the light transmitting terminal pass sequentially through the first lens, the field lens, the optical component, and the second lens, and finally focus at the light receiving terminal.

In some embodiment, the field lens is a concave or plano-concave lens, and the image point associated with the first lens is a virtual image point located on the same side as the light receiving terminal relative to the field lens.

In some embodiments, a distance between the light transmitting terminal and the first lens is greater than the focal length of the first lens. Optical signals sent from the light transmitting terminal pass sequentially through the first lens, the field lens, the optical component, and the second lens, and finally focus at the light receiving terminal.

In some embodiments, the optical component comprises an optical circulator, a wavelength division multiplexing (WDM) device, a demultiplexer, or a combination thereof.

An optical module is further provided in the present disclosure. The optical module comprises the above-described optical assembly.

In the present disclosure, a field lens is added to an optical assembly. The field lens is configured to absorb an alignment error when the optical assembly is being assembled and to draw optical signals that are deviating outside the optical assembly back to the subsequent part of the optical assembly for transmission. The field lens increases the tolerance of the optical assembly and reduces the requirement for precision when the optical assembly is being assembled, and increases the coupling efficiency of the optical assembly as a whole.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely exemplary apparatuses and methods consistent with aspects related to the invention as recited in the appended claims.

In order to facilitate the presentation of the figures in the present disclosure, the sizes of certain structures or parts have been enlarged relative to other structures or parts. As such, they are only for the purpose of illustrating the basic structure of the subject matter of the present disclosure.

Terms in the text indicating a relative spatial position, such as "upper," "above," "lower," "below," and so forth, are used for explanatory purposes in describing the relationship between a unit or feature depicted in a drawing with another unit or feature therein. Terms indicating a relative spatial position can refer to positions other than those depicted in the figures when a device is being used or operated. For example, if the device shown in a figure is flipped over, a unit which is described as being located "below" or "under" another unit or feature will be located "above" the other unit or feature. Therefore, the exemplary term "below" can include positions both above and below. A device can be oriented in other ways (e.g., rotated 90 degrees or facing another direction). As such, descriptive spatially-related terms that appear in the text should be interpreted accordingly.

When an element or layer is said to be "above" another part or layer, or "connected to" another part or layer, it may be directly above the other part or layer or directly connected to the other part or layer, or there may be an intermediate element(s) or layer(s). Conversely, when a part is said to be "directly above another part or layer" or "directly connected to another part or layer," there cannot be any intermediate parts or layers.

FIG. 1 is a schematic diagram showing an optical path of transmission in an optical assembly 100' in a conventional technology. As shown in FIG. 1, for conventional technologies, optical modules typically use an optical assembly 100' with a dual-lens system. Following along the direction of an optical axis 18' of the optical path, the optical assembly sequentially comprises a light transmitting terminal 11', a first lens 12', an optical component 13', a second lens 14', and a light receiving terminal 15'. The first lens 12' is a collimating lens, used to collimate optical signals sent from the light transmitting terminal 11', and the second lens 14' is a focusing lens, used to focus the various optical signals transmitted from the optical component at the light receiving terminal 15'.

Figure 2:
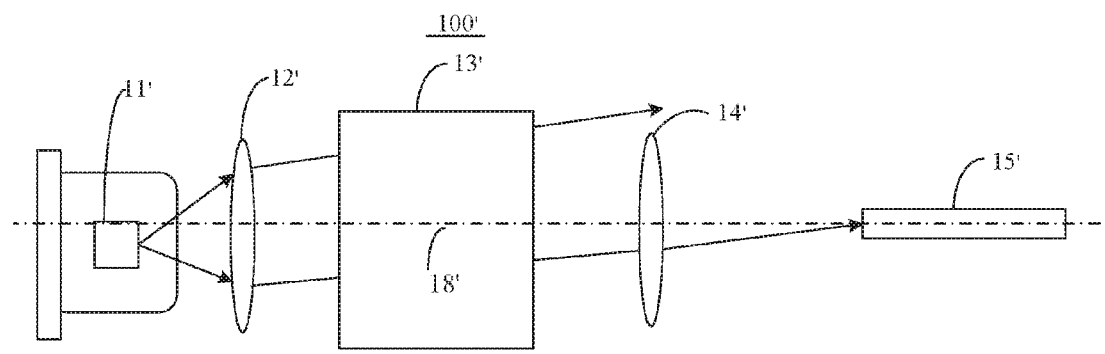
FIG. 2 is a schematic diagram showing an optical path of transmission in the optical assembly of FIG. 1 with an alignment error.

In an optical assembly with a dual-lens system, however, the light transmitting terminal 11' and the first lens 12' must be aligned and positioned with high precision due to the relatively large mismatch of divergence angles between the light transmitting terminal 11' and the light receiving terminal 15'. In order to attain a relatively high coupling efficiency, the first lens 12' generally requires an M-value of approximately 4. In addition, because the optical path is relatively long, a slight deviation in the alignment between the light transmitting terminal 11' and the first lens 12' in the direction of concentricity will result in a relatively large deviation in the light beam position as the entire optical path reaches the end of the optical path system, or a portion of the light beams may stray outside the receivable range of the optical assembly. FIG. 2 is a schematic diagram showing an optical path of transmission in the optical assembly 100' of FIG. 1 with an alignment error. As shown in FIG. 2, the alignment error creates a significant impact on the coupling efficiency of the optical assembly as a whole when the light receiving terminal must be positioned with a high precision.

Figure 3:
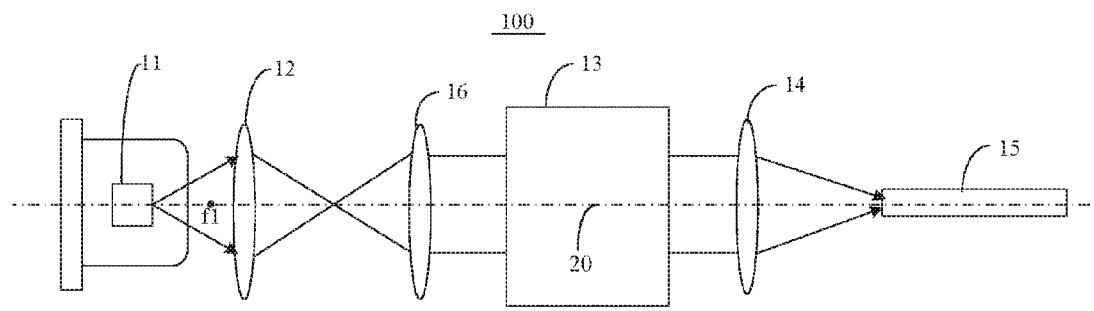
FIG. 3 is a schematic diagram showing an optical path of transmission in an optical assembly, according to an exemplary embodiment.

FIG. 3 shows an optical assembly 100 provided by an exemplary embodiment of the present disclosure. The optical assembly 100 comprises a light transmitting terminal 11, a light receiving terminal 15, and an optical component 13 located between the light transmitting terminal 11 and the light receiving terminal 15. The optical assembly further comprises a first lens 12 located between the optical component 13 and the light transmitting terminal 11, a second lens 14 located between the optical component 13 and the light receiving terminal 15, and a field lens 16 located between the first lens 12 and the optical component 13. The first lens 12 and the field lens 16 act as a collimating unit for the optical assembly 100. The field lens 16 is used to absorb an alignment error between the light transmitting terminal 11 and the first lens 12, and the second lens 14 acts as a focusing unit for the optical assembly 100.

The first lens 12 and the second lens 14 are convex or plano-convex lenses, and the field lens 16 is a convex or plano-convex lens. This exemplary embodiment illustrates an example in which the first lens 12 and the second lens 14 are convex lenses and the field lens 16 is a convex lens.

In some embodiments, the light transmitting terminal 11 in the optical assembly 100 of the present embodiment may include a laser, or a Transmitter Outline can (TO can), etc. The light receiving terminal 15 may include a fiber-optic receiver, or a photoelectric detector, etc. The optical component may comprise, but is not limited to, an optical circulator(s), a wavelength division multiplexing (WDM) device(s), a demultiplexer(s), etc. No further examples will be detailed here.

The focal length of the first lens 12 in the present embodiment is denoted by f1. A distance between the light transmitting terminal 11 and the first lens 12 is greater than the focal length f1 of the first lens 12, i.e., the light transmitting terminal 11 is situated outside the left focal point of the first lens 12. The image point associated with the first lens 12 is a real image point located between the first lens 12 and the field lens 16.

The specific principle of optical signal transmission is as follows. First, optical signals sent from the light transmitting terminal 11 are transmitted through the first lens 12 and converge on the right side of the first lens 12. The converged optical signals pass through the image point associated with the first lens 12. Next, the converged optical signals which have passed through the first lens 12 are collimated by the field lens 16. The resulting plurality of parallel optical signals are transmitted through the optical component 13. Finally, the parallel optical signals are focused by the second lens 14 at the light receiving terminal 15 where they are further transmitted.

In FIG. 3, the light transmitting terminal 11, the first lens 12, the field lens 16, the optical component 13, the second lens 14, and the light receiving terminal 15 are all situated on an optical axis 20. During actual implementation, however, there is typically an alignment error between the light transmitting terminal 11 and the first lens 12.

Figure 4:
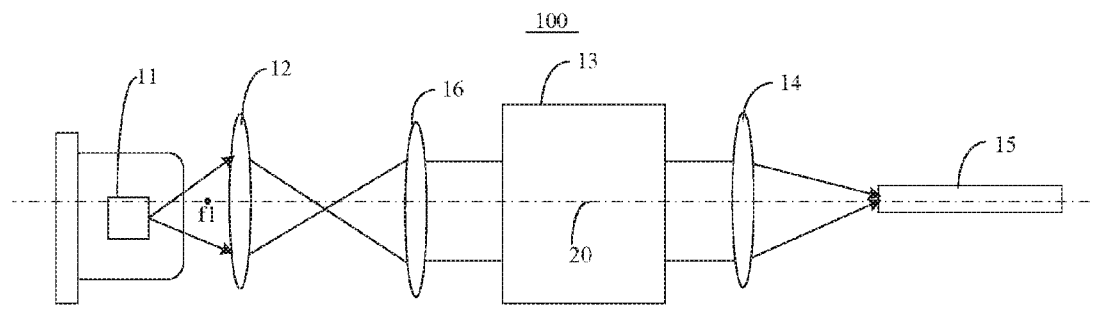
FIG. 4 is a schematic diagram showing an optical path of transmission in the optical assembly of FIG. 3 with an alignment error, according to an exemplary embodiment.

FIG. 4 shows the light transmitting terminal 11 situated at a certain distance from the optical axis 20. In this case, compared to FIG. 3, there will also be a certain deviation with respect to the optical signals sent from the light transmitting terminal 11 after they are transmitted through the first lens 12. The addition of the field lens 16 absorbs the alignment error between the light transmitting terminal 11 and the first lens 12 and draws the optical signals which are deviating outside the optical assembly back to the subsequent part of the optical assembly 100 for transmission.

As shown in FIG. 4, after being collimated by the first lens 12 and the field lens 16, the optical signals become a plurality of parallel optical signals. They are transmitted through the optical component 13 before being finally focused by the second lens 14 at the light receiving terminal 15.

Figure 5:
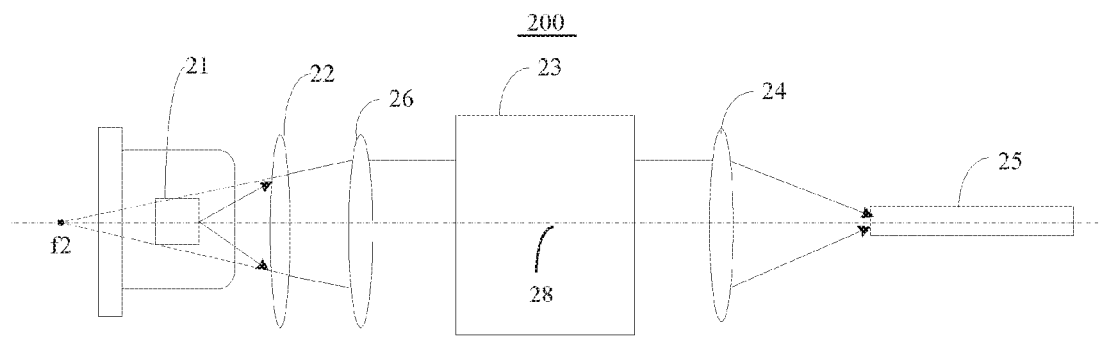
FIG. 5 is a schematic diagram showing an optical path of transmission in an optical assembly, according to another exemplary embodiment.

FIG. 5 shows an optical assembly 200 provided by another exemplary embodiment of the present disclosure. The optical assembly 200 comprises a light transmitting terminal 21, a light receiving terminal 25, and an optical component 23 located between the light transmitting terminal 21 and the light receiving terminal 25. The optical assembly 200 further comprises a first lens 22 located between the optical component 23 and the light transmitting terminal 21, a second lens 24 located between the optical component 23 and the light receiving terminal 25, and a field lens 26 located between the first lens 22 and the optical component 23. The first lens 22 and the field lens 26 act as a collimating unit for the optical assembly 200. The field lens 26 is used to absorb an alignment error between the light transmitting terminal 21 and the first lens 22, and the second lens 24 acts as a focusing unit for the optical assembly 200.

The first lens 22 and the second lens 24 are convex or plano-convex lenses, and the field lens 26 is a convex or plano-convex lens. Just as in the previous exemplary embodiment (the optical assembly 100), the present embodiment illustrates an example in which the first lens 22 and the second lens 24 are convex lenses and the field lens 26 is a convex lens.

In some embodiments, the light transmitting terminal 21 in the optical assembly 200 of the present embodiment may include a laser, or a Transmitter Outline can (TO can), etc. The light receiving terminal 25 may include a fiber-optic receiver, or a photoelectric detector, etc. The optical component 23 may comprise, but is not limited to, an optical circulator(s), a WDM device(s), a demultiplexer(s), etc. No further examples will be detailed here.

Unlike the optical assembly 100, the curvature radius of the first lens 22 in the present embodiment is more than the curvature radius of the first lens 12 in the optical assembly 100. The focal length of the first lens 22 is denoted by f2. A distance between the light transmitting terminal 21 and the first lens 22 is less than the focal length f2 of the first lens 22, i.e., the light transmitting terminal 21 is situated inside the left focal point of the first lens 22. The image point associated with the first lens 22 is a virtual image point located on the left side of the light transmitting terminal 21.

The specific principle of optical signal transmission is as follows. First, optical signals sent from the light transmitting terminal 21 are transmitted through the first lens 22. The transmitted optical signals continue to diverge and are not able to converge into an image point. Next, the optical signals which have passed through the first lens 22 are collimated by the field lens 26, and the resulting plurality of parallel optical signals are transmitted through the optical component 23. Finally, the parallel optical signals are focused by the second lens 24 at the light receiving terminal 25 where they are further transmitted.

In FIG. 5, the light transmitting terminal 21, the first lens 22, the field lens 26, the optical component 23, the second lens 24, and the light receiving terminal 25 are all situated on an optical axis 28. During actual implementation, however, there is typically an alignment error between the light transmitting terminal 21 and the first lens 22.

Figure 6:
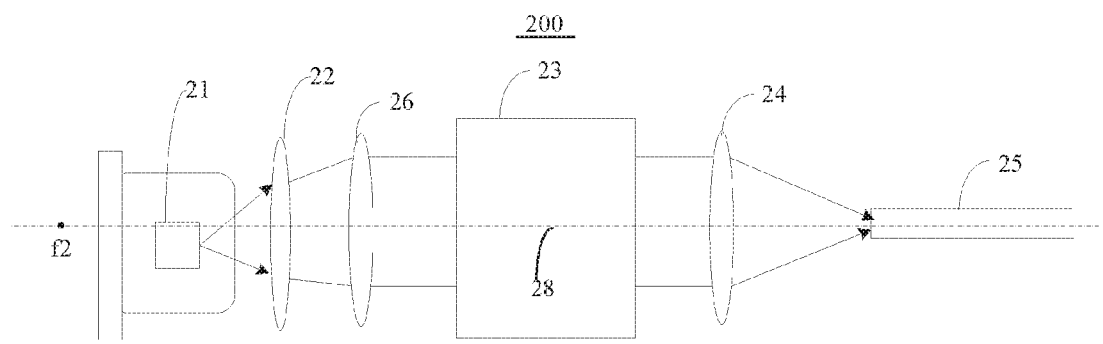
FIG. 6 is a schematic diagram showing an optical path of transmission in the optical assembly of FIG. 5 with an alignment error, according to an exemplary embodiment.

FIG. 6 shows the light transmitting terminal 21 situated at a certain distance from the optical axis 28. In this case, compared to FIG. 5, there will also be a certain deviation with respect to the optical signals sent from the light transmitting terminal 21 after they are transmitted through the first lens 22. The addition of the field lens 26 absorbs the alignment error between the light transmitting terminal 21 and the first lens 22 and draws the optical signals which are deviating outside the optical assembly back to the subsequent part of the optical assembly for transmission.

As shown in FIG. 6, after being collimated by the first lens 22 and the field lens 26, the optical signals become a plurality of parallel optical signals. They are transmitted through the optical component 23 before being finally focused by the second lens 24 at the light receiving terminal 25.

Figure 7:
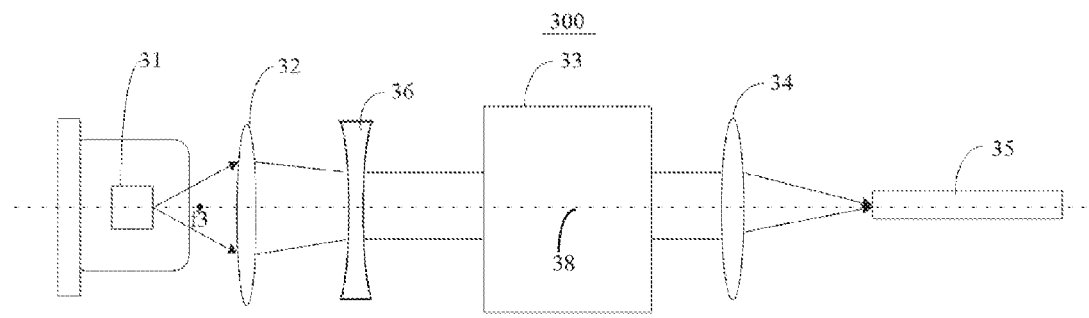
FIG. 7 is a schematic diagram showing an optical path of transmission in an optical assembly, according to yet another exemplary embodiment.

FIG. 7 shows an optical assembly 300 provided by yet another exemplary embodiment of the present disclosure. The optical assembly 300 comprises a light transmitting terminal 31, a light receiving terminal 35, and an optical component 33 located between the light transmitting terminal and the light receiving terminal. The optical assembly 300 further comprises a first lens 32 located between the optical component 33 and the light transmitting terminal 31, a second lens 34 located between the optical component 33 and the light receiving terminal 35, and a field lens 36 located between the first lens 32 and the optical component 33. The first lens 32 and the field lens 36 act as a collimating unit for the optical assembly 300, the field lens 36 is used to absorb an alignment error between the light transmitting terminal 31 and the first lens 32, and the second lens 34 acts as a focusing unit for the optical assembly 300.

The first lens 32 and the second lens 34 are convex or plano-convex lenses, and the field lens 36 is a concave or plano-concave lens. The present embodiment illustrates an example in which the first lens 32 and the second lens 34 are convex lenses and the field lens 36 is a concave lens.

In some embodiments, the light transmitting terminal 31 in the optical assembly 300 of the present embodiment may include a laser, or a TO can, etc. The light receiving terminal 35 may include a fiber-optic receiver, or a photoelectric detector, etc. The optical component 33 may comprise, but is not limited to, an optical circulator(s), a WDM device(s), a demultiplexer(s), etc. No further examples will be detailed here.

The focal length of the first lens 32 in the present embodiment is denoted by f3. A distance between the light transmitting terminal 31 and the first lens 32 is greater than the focal length f3 of the first lens 32, i.e., the light transmitting terminal 31 is situated outside the left focal point of the first lens 32. Unlike the optical assembly 100, the image point associated with the first lens 32 of the present embodiment is a virtual image point located on the right side of the field lens 36.

The specific principle of optical signal transmission is as follows. First, optical signals sent from the light transmitting terminal 31 are transmitted through the first lens 32, and the transmitted optical signals continue in a convergent form. The image point associated with the first lens 32, however, is a virtual image point on the right side of the field lens 36, and the optical signals do not converge at one point between the first lens 32 and the field lens 36. Next, the optical signals which have passed through the first lens 32 are collimated by the field lens 36, and a resulting plurality of parallel optical signals are transmitted through the optical component 33. Finally, the parallel optical signals are focused by the second lens 34 at the light receiving terminal 35 where they are further transmitted.

In FIG. 7, the light transmitting terminal 31, the first lens 32, the field lens 36, the optical component 33, the second lens 34, and the light receiving terminal 35 are all situated on an optical axis 38. During actual implementation, however, there is typically an alignment error between the light transmitting terminal 31 and the first lens 32.

Figure 8:
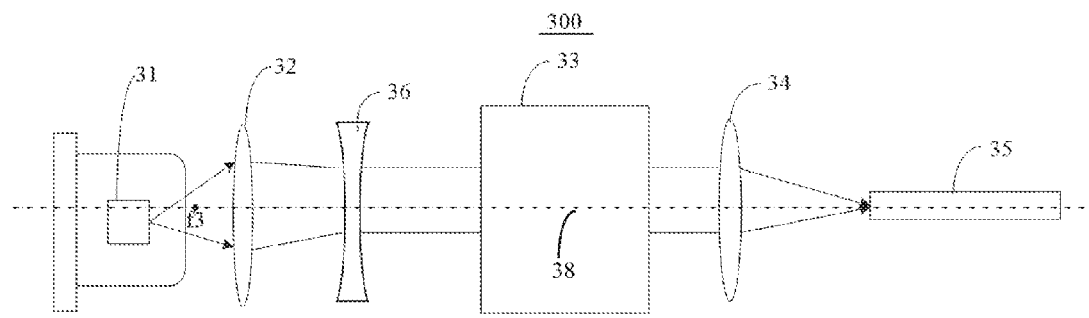
FIG. 8 is a schematic diagram showing an optical path of transmission in the optical assembly of FIG. 7 with an alignment error, according to an exemplary embodiment.

FIG. 8 shows a light transmitting terminal 31 situated at a certain distance from the optical axis 38. In this case, compared to FIG. 7, there will also be a certain deviation with respect to the optical signals sent from the light transmitting terminal 31 after they are transmitted through the first lens 32. The addition of a field lens 36 absorbs the alignment error between the light transmitting terminal 31 and the first lens 32 and draws the optical signals which are deviating outside the optical assembly 300 back to the subsequent part of the optical assembly 300 for transmission.

As shown in FIG. 8, after being collimated by the first lens 32 and the field lens 36, the optical signals become a plurality of parallel optical signals. They are transmitted through the optical component 33 before being finally focused by the second lens 34 at the light receiving terminal 35.

The above-referenced exemplary embodiments are applicable to optical assemblies with a relatively long optical path, such as light receiving modules, light transmitting modules, or bidirectional light transceiver modules. Simply adding a field lens in the optical path reduces the impact of alignment error on the optical assembly and increases the coupling efficiency of the optical assembly as a whole.

The present disclosure offers the following advantageous effects through the exemplary embodiments mentioned above. The addition of a field lens enables an optical assembly to absorb an alignment error in the optical assembly and draw any optical signals which have deviated outside the optical assembly back to the subsequent part of the optical assembly for transmission. It increases the tolerance and reduces the requirement for precision when the optical assembly is being assembled, facilitates the assembly process, and increases the coupling efficiency of the optical assembly as a whole.

Other embodiments of the invention will be apparent to those skilled in the art from consideration of the specification and practice of the invention disclosed here. The illustrated steps are set out to explain the exemplary embodiments shown, and it should be anticipated that ongoing technological development will change the manner in which particular functions are performed. These examples are presented herein for purposes of illustration, and not limitation. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes may be made without departing from the scope thereof. It is intended that the scope of the invention should only be limited by the appended claims.

What is claimed is:

1. An optical assembly, comprising:
   a light transmitting terminal;
   a light receiving terminal;
   an optical component located between the light transmitting terminal and the light receiving terminal;
   a collimating unit located between the optical component and the light transmitting terminal; and
   a focusing unit located between the optical component and the light receiving terminal,
   wherein:
     the collimating unit comprises:
       a first lens located between the optical component and the light transmitting terminal; and
       a field lens located between the first lens and the optical component and configured to absorb an alignment error between the light transmitting terminal and the first lens,
     and
     the focusing unit comprises a second lens located between the optical component and the light receiving terminal.

2. The optical assembly according to claim 1, wherein:
the first lens is a convex lens or a plano-convex lens;
the second lens is a convex lens or a plano-convex lenses; and
the field lens is a convex lens, a plano-convex lens, a concave lens, or a plano-concave lens.

3. The optical assembly according to claim 2, wherein:
the field lens is a convex or plano-convex lens; and
an image point associated with the first lens is a real image point located between the first lens and the field lens.

4. The optical assembly according to claim 3, wherein:
a distance between the light transmitting terminal and the first lens is greater than a focal length of the first lens; and
optical signals sent from the light transmitting terminal pass sequentially through the first lens, the field lens, the optical component, and the second lens and focus at the light receiving terminal.

5. The optical assembly according to claim 2, wherein:
the field lens is a convex or plano-convex lens; and
an image point associated with the first lens is a virtual image point located on the same side as the light transmitting terminal relative to the first lens.

6. The optical assembly according to claim 5, wherein:
a distance between the light transmitting terminal and the first lens is less than a focal length of the first lens; and
optical signals sent from the light transmitting terminal pass sequentially through the first lens, the field lens, the optical component, and the second lens and focus at the light receiving terminal.

7. The optical assembly according to claim 2, wherein:
the field lens is a concave or plano-concave lens;
an image point associated with the first lens is a virtual image point located on the same side as the light receiving terminal relative to the field lens.

8. The optical assembly according to claim 7, wherein:
a distance between the light transmitting terminal and the first lens is greater than a focal length of the first lens; and
optical signals sent from the light transmitting terminal pass sequentially through the first lens, the field lens, the optical component, and the second lens and focus at the light receiving terminal.

9. The optical assembly according to claim 1, wherein the optical component comprises one or more of: an optical circulator, a wavelength division multiplexing (WDM) device, and a demultiplexer.

10. An optical module, comprising:
an optical assembly, the optical assembly comprising:
a light transmitting terminal;
a light receiving terminal;
an optical component located between the light transmitting terminal and the light receiving terminal;
a collimating unit located between the optical component and the light transmitting terminal; and
a focusing unit located between the optical component and the light receiving terminal,
wherein:
the collimating unit comprises:
a first lens located between the optical component and the light transmitting terminal; and
a field lens located between the first lens and the optical component and configured to absorb an alignment error between the light transmitting terminal and the first lens,
and
the focusing unit comprises a second lens located between the optical component and the light receiving terminal.

11. The optical module according to claim 10, wherein:
the first lens is a convex lens or a plano-convex lens;
the second lens is a convex lens or a plano-convex lenses; and
the field lens is a convex lens, a plano-convex lens, a concave lens, or a plano-concave lens.

12. The optical module according to claim 11, wherein:
the field lens is a convex or plano-convex lens; and
an image point associated with the first lens is a real image point located between the first lens and the field lens.

13. The optical module according to claim 12, wherein:
a distance between the light transmitting terminal and the first lens is greater than a focal length of the first lens; and
optical signals sent from the light transmitting terminal pass sequentially through the first lens, the field lens, the optical component, and the second lens and focus at the light receiving terminal.

14. The optical module according to claim 11, wherein:
the field lens is a convex or plano-convex lens; and
an image point associated with the first lens is a virtual image point located on the same side as the light transmitting terminal relative to the first lens.

15. The optical module according to claim 14, wherein:
a distance between the light transmitting terminal and the first lens is less than a focal length of the first lens; and
optical signals sent from the light transmitting terminal pass sequentially through the first lens, the field lens, the optical component, and the second lens and focus at the light receiving terminal.

16. The optical module according to claim 11, wherein:
the field lens is a concave or plano-concave lens;
an image point associated with the first lens is a virtual image point located on the same side as the light receiving terminal relative to the field lens.

17. The optical module according to claim 16, wherein:
a distance between the light transmitting terminal and the first lens is greater than a focal length of the first lens; and
optical signals sent from the light transmitting terminal pass sequentially through the first lens, the field lens, the optical component, and the second lens and focus at the light receiving terminal.

18. The optical module according to claim 10, wherein the optical component comprises one or more of: an optical circulator, a wavelength division multiplexing (WDM) device, and a demultiplexer.

* * * * *